Figure 1:
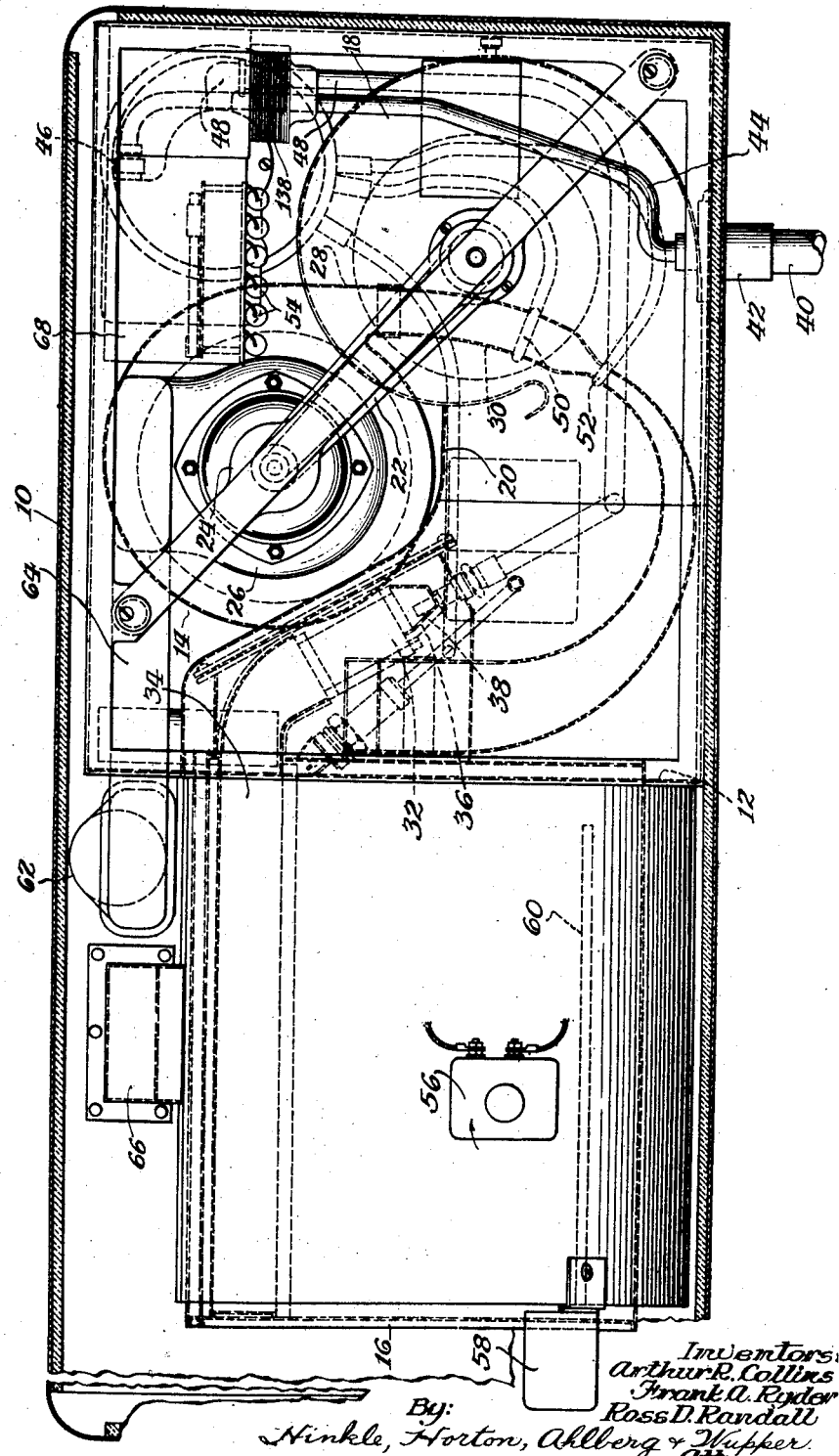

Jan. 11, 1955     A. R. COLLINS ET AL     2,699,292
HEATER CONTROL SYSTEM
Original Filed July 17, 1946

Inventors:
Arthur R. Collins
Frank A. Ryder
Ross D. Randall
By: Hinkle, Horton, Ahlberg & Wupper
Attorneys Jan. 11, 1955  A. R. COLLINS ET AL  2,699,292
HEATER CONTROL SYSTEM
Original Filed July 17, 1946  2 Sheets-Sheet 2

Inventors:
Arthur R. Collins
Frank A. Ryder
Ross D. Randall
By:
Hinkle, Horton, Ahlberg & Wupper
Attorneys.

United States Patent Office 2,699,292
Patented Jan. 11, 1955

2,699,292

HEATER CONTROL SYSTEM

Arthur R. Collins, Indianapolis, Ind., and Frank A. Ryder, San Rafael, and Ross D. Randall, Burbank, Calif., assignors to Stewart-Warner Corporation, Chicago, Ill., a corporation of Virginia Original application July 17, 1946, Serial No. 684,350, now Patent No. 2,581,942, dated January 8, 1952. Divided and this application April 14, 1951, Serial No. 221,081

3 Claims. (Cl. 236—68)

The present invention relates to heater control systems primarily for hot air heaters of the forced air circulating type.

This application is a division of our copending application, Serial No. 684,350, filed July 17, 1946, now Patent No. 2,581,942, for House Heaters.

Ordinarily house heaters or furnaces of the forced air circulating type normally cycle on and off according to demand with the result that the temperature may fluctuate considerably and in addition the rate of air circulation is not held uniform with the result that the air within the space being heated has a different temperature gradient from floor to ceiling, at different times, depending upon whether the air is circulating or not. The result attained by such system, therefore, usually is such that when the furnace is operating the temperature in the space being heated is likely to seem too hot, while when the furnace is not operating the temperature gradient becomes greater with the result that the room frequently seems too cold. It is one of the objects of the present invention to overcome this disadvantage generally associated with conventional hot air heating systems.

Another disadvantage present in ordinary hot air heating systems is that when the blower is operating it operates at full capacity and, therefore, is noisy. The present invention overcomes this disadvantage by modulating the heat output so that the amount of hot ventilating air supplied is always closely approximate to that needed to maintain the desired temperature, with the result that the ventilating air blower and the heating system generally very seldom operate at full capacity. The noise level, therefore, is quite low.

In general it may be said, therefore, that the heating system comprising the present invention is made up of a gas burner, although other fuels could be used, which heats a heat exchanger in which heat is transferred to a ventilating air stream. Both ventilating air and combustion air are supplied to the heater by means of blowers and the heat output and the rate of circulation of ventilating air are both modulated so that the temperature of the ventilating air remains substantially constant, although the amount of ventilating air—and, therefore, the amount of heat supplied—varies according to the need as determined by a thermostat located within the space to be heated.

An additional object is to accomplish all of the above in a heater of small size which can be built at relatively low cost considering the order of its performance.

Figure 2:
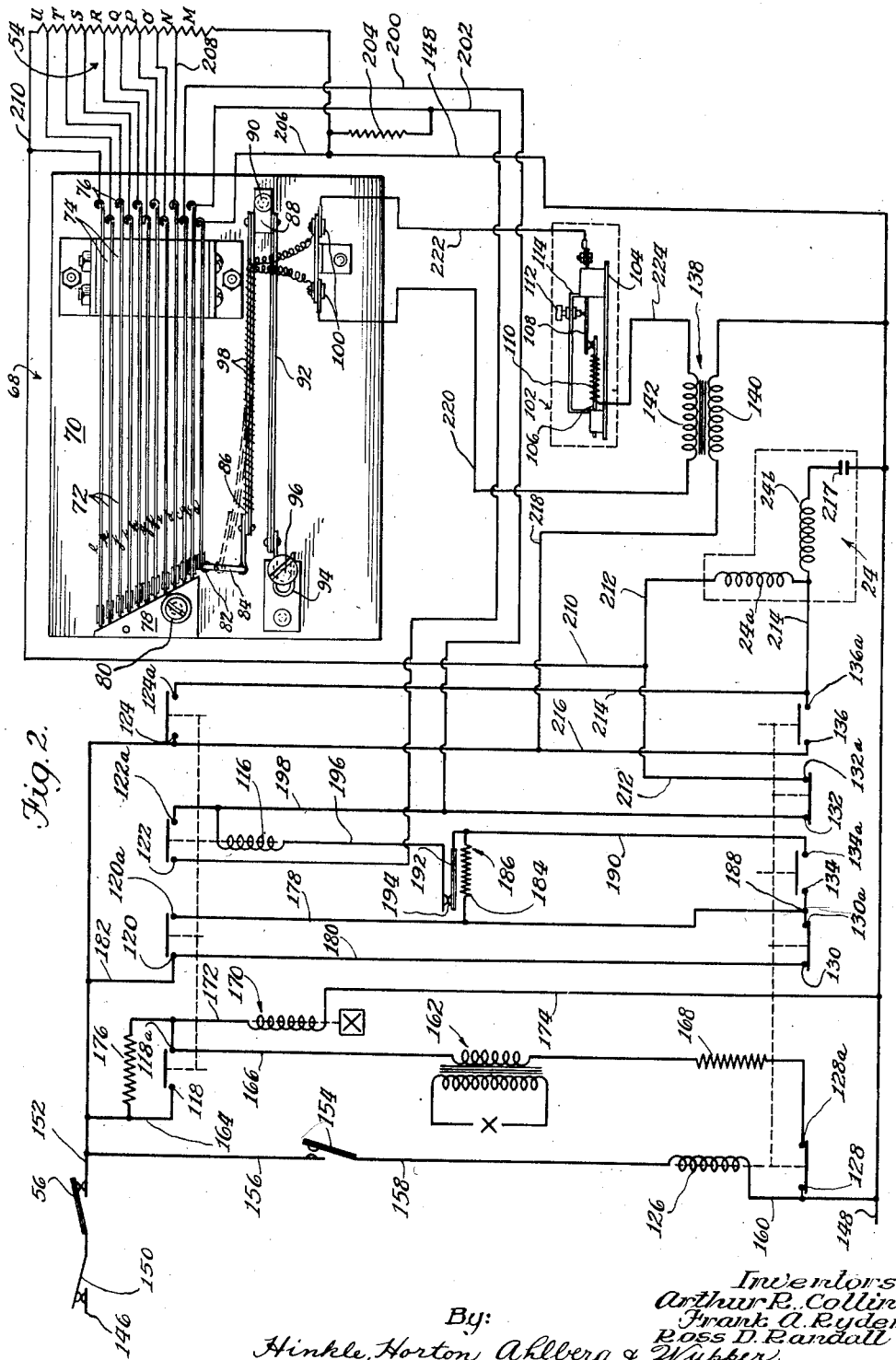

Other objects and advantages will become apparent from the following description of a preferred embodiment of our invention which is illustrated in the accompanying drawings, in which:

Fig. 1 is a front view partly in section of a heater embodying the present invention and showing the general organization of the various units; and Fig. 2 is a circuit diagram of the control system with one of the control elements thereof set out in considerable detail so as to show its structure.

Referring to Figure 1, it will be seen that the heater there shown comprises a case 10 which is generally rectangular in shape and which houses the operating elements. This case is divided transversely by a vertical partition 12 so as to form the space 14 toward the right for the major portion of the mechanism. Air to be heated is also drawn into this space by an opening in the front of the cabinet 10. This opening is not shown because the plane of the section is somewhat behind the opening. To the left of the partition 12 the case 10 houses a heat exchanger 16 through which ventilating air is passed from right to left. Hot air passing from the left-hand end of the heat exchanger 16 finds its way forwardly and out of an opening in the front of the case 10 which is slightly ahead of the plane of the section of this figure.

Ventilating air is drawn into a centrifugal blower 18 located in the right-hand compartment and is passed into a shroud 20 which conducts the air to the right-hand end of the heat exchanger 16. The blower 18 is driven by a belt 22 connected to the pulley of the motor 24 which also drives the combustion air blower 26. Combustion air from the blower 26 is passed from a scroll case 28 into a duct 30 which leads to a plenum chamber 32 which surrounds the inlet end of a longitudinally extending burner 34. A gas and air mixer 36 is located within this plenum chamber so that gas flowing from a jet 38 intermixes with air, the mixture then being passed to the burner tube.

Gas arrives at the heater by way of a pipe 40 connected to a fitting 42 which in turn is connected to a tube 44 leading to a gas pressure regulating valve 46. From the valve fuel passes to the nozzle 38 by way of a tube 48.

The valve 46 is so constructed as to modulate the gas pressure in the tube 48 according to the air pressure differential thereacross. This air pressure differential is obtained by means of a pair of taps 50 and 52 connected, respectively, upstream of and at the throat of a Venturi section constructed in the duct 30 leading from the combustion air blower to the plenum chamber.

The speed of the blower motor 24, and, therefore, the speed of operation of both combustion air blower and ventilating air blower, is controlled by a bank of resistance elements indicated generally at 54 in Figure 1.

The heater also includes an overheat control switch 56 mounted upon the heat exchanger 16 at one side thereof, and a flame detector switch 58 having a thermostatic control element 60 extending into the combustion space. Air for combustion is drawn in through an opening represented by the conduit 62, and, after passing through a horizontal duct 64 to the blower 26 and thence to the combustion chamber, is exhausted back to the atmosphere by way of an exhaust fitting 66 connected to the top of the heat exchanger.

All the above elements of the heater are set out in greater detail in the previously referred to copending application and need not be discussed in greater detail here since the invention to which the present application relates is concerned primarily with the control system by means of which the speed of the motor 24 is controlled according to the requirement for heat, it being understood from the above that the heat output of the heater will rise and fall along the speed of the motor 24 since any increase of the speed of the motor 24 is accompanied by an increased rate of supply of combustion air and fuel and an increased rate in the supply of ventilating air.

Referring now to Figure 2, it will be seen that the circuit there shown includes relay switches, transformers, and the like, which may be considered as conventional control circuit elements and need no specific description other than their connections and functioning within the circuit. There is, however, a motor speed controller indicated generally by the numeral 68 which comprises a base 70 to which are secured twelve contact-carrying blades 72. More or less could of course be used. These blades are secured in conventional stacked relationship between insulating spacing blocks 74 so that their extreme ends project beyond the block in one direction and form terminals 76 while their opposite ends extend sufficiently in the opposite direction to provide considerable flexibility. The free ends of the blades are cut so that beginning at the top, as shown, each blade is slightly shorter than the next adjacent blade located thereabove. The blades are biased so that they tend to spring downwardly beyond the central point somewhat and are maintained upwardly by a tapered block 78 secured to the base by a screw 80. Each of the blades carries a contact adjacent its free end adapted to complete a circuit between the blade upon which it is secured and the next adjacent blade above and below when the blades are moved toward each other. Normally, however, when the free ends of all of the blades are against the block 78, the contacts will be separated.

The lowermost contact strip is formed at its free end to provide an eye 82 connected by means of a U-shaped link 84 to the end of a bimetal thermostatic blade 86. The opposite end of this blade is secured to a block 88 journalled upon a pin 90. The opposite face of this block in turn is connected to a second bimetal element 92 which extends parallel to the thermostatic element 86. This strip 92 at its opposite end is secured to a yoke 94 which embraces an eccentric pin 96 which may be rotated relative to the base 70. Thus by turning the eccentric pin the left-hand end of thermostatic blade 92 can be moved upwardly and downwardly. The upper bimetal element 86 is wound with an electric resistance heater 98 which is intermittently supplied with electric power according to the temperature in the space to be heated, as will be brought out more fully presently. The ends of this resistance element are brought out and secured to terminals 100.

This device operates as follows: When electric power is supplied to the terminals 100 the temperature of the heater 98 and, therefore, of the bimetal strip 86, will be raised somewhat. This causes the free end of the bimetal strip to deflect upwardly toward the dotted line position so as to urge the lowermost contact strip 72 upwardly. Upon slight upward movement this contact is brought into engagement with the next above contact so as to complete a circuit between the two lowermost strips. Additional upward movement will urge the second strip into engagement with the third so as to short the three lowermost strips, and so on. The bottom bimetal strip 92 acts as an ambient temperature compensating element so that changes of the temperature in the compartment where the device is located will not affect the operation of the motor controller. Normally increasing the temperature in the space where the device is located would have the same effect upon the bimetal strip 86 as would increase in rate of current supply to the terminals 100. This is compensated for, however, because any ambient conditions which cause the upper bimetal strip 86 to flex so as to move its free end upwardly will also cause the lower strip 92 to flex similarly, thereby rotating the block 88 in such direction as to compensate for the upward movement of the free end of the upper element. The converse is of course true. Thus, changes in ambient temperature do not cause movement of the free end of the upper bimetal element.

The sending unit for supplying current to the heater 98 is shown diagrammatically and is indicated by the numeral 102. This device comprises a base 104 to which two opposed contacting bimetal elements 106 and 108 are attached. One of these elements 106 is provided with an electric heater 110 connected at one end to the strip 106. The second of the strips 108 is controlled by an adjustment knob 112 threaded through a bracket 114 so that when the knob is turned in one direction the lower end thereof will press the strip 108 downwardly. When a device of this character is connected in series with the bimetal heater 98, such that current flows through the strip 108, through the contacts to the strip 106, thence to the heater 110, and finally through the power source and back to the heater 98, the current will cause the temperature of the heater 110 to increase. This in turn heats the bimetal element 106 and causes its free end to move downwardly, thereby separating the contacts. As soon as this happens, current ceases to flow, whereupon the heater 110 and strip 106 cool until the contacts are brought together once more. This cycle repeats itself endlessly and the length of the on and off periods will depend upon the position of the contact secured to the strip 108. If this contact is in a higher location, less current will need to flow through the heated location, less current will need to flow through the heater 110 in order to separate the contacts, thereby giving longer off-cycles and shorter on-cycles. The converse is also true. Inasmuch as the strip 108 is a bimetal element sensitive to the space to be heated, the location of the contact secured thereto will be determined by the temperature of the room. The direction of deflection of the bimetal element 108 is such that a decrease in temperature tends to cause this element to move downwardly so as to send longer on-cycles and shorter off-cycles. This causes the heater 98 to be energized for a greater portion of time with the result that its mean temperature rises. As explained previously, this causes the free end of its bimetal element 86 to move upwardly so as to short successive contacts mounted upon the strips 72 such that the greater the decrease in temperature within the room, the more of these contacts will be shorted. A bank of resistance elements comprises a portion of this speed controller and is indicated generally by the numeral 54 previously referred to. In Figure 2 these resistance elements are shown diagrammatically.

The circuit includes a relay, the coil of which is indicated by the numeral 116. This relay has four normally open sets of contacts, indicated respectively by the numbers 118, 118a, 120, 120a, 122, 122a, and 124, 124a. There is also a flame detector relay having a coil indicated by the numeral 126. This relay has three normally closed sets of contacts 128—128a, 130—130a, and 132—132a. It is also provided with two sets of normally open contacts 134—134a and 136—136a. In addition, a control transformer 138 having a primary 140 operating at line voltage and a secondary 142 which supplies a control current at approximately 24 volts is used.

Power to the circuit is brought in across lines 146 and 148 at a convenient line voltage. This will usually be 115 volts, 60 cycle, and, therefore, for purpose of discussion such a line voltage will be assumed. One side of the line 146 supplies energy through a master switch 150 by means of which the heating system may be turned on and off. If desired, of course, this may be a double pole, single throw switch in both sides of the line. The switch 150 is in turn connected through the overheat switch 56 to the main heater operating line 152. Thus, opening of the overheat switch 56 serves the same function as the master switch in de-energizing the entire heating system. The flame detector relay coil 126 and the flame detector switch 154 are connected in series across the line by leads 156 which extend from the line 152 to the flame detector switch and thence from the switch to the flame detector relay coil through lead 158 and from the other end of the flame detector relay coil by way of lead 160 to the other side of the line 148. Thus, whenever the temperature within the heater has risen sufficiently to close the flame detector switch 154, the relay coil 126 will be energized. Conversely, opening of the switch 154 de-energizes the coil 126.

The primary of a spark transformer 162 is also connected across the line in series with contacts in both of the relays by means of a wire 164 which leads from the line 152 to relay contact 118, the other contact 118a of this group being connected directly to one side of the spark transformer primary by a lead 166. The other side of the primary is connected through a current limiting resistor 168 to the contact 128a of the flame detector relay while the other contact in this set, 128, is connected to the other side of the line by way of a branch extended to the lead 160. Thus, in order for the spark transformer to be energized, it is necessary that contacts 118—118a and 128—128a both be closed. The resistor 168 may or may not be used, depending upon the characteristics of the transformer. In practice it has been found that a considerably smaller transformer is adequate for ignition purposes and has the advantage of being lower in cost and taking up less space if the resistor 168 is used. This resistor has little effect upon the amount of current in the primary of the transformer at the time of breaking down the arc between the spark plug terminals. However, it limits the current in the secondary circuit under the low resistance conditions prevailing once the arc has been established.

A gas valve coil 170 is also energized when relay contacts 118—118a close. It is connected on one side directly to contact 118a by a lead 172, the other side being connected directly to the other side of the line 148 by a lead 174. Preferably, depending upon the characteristics of the gas valve, a resistor 176 of comparatively high value is connected across the terminals 118—118a so as to provide a leakage path which prevents the possibility of the gas valve holding open if the circuit to this valve should happen to be broken during one of the voltage peaks of the alternating current supply circuit. It occasionally happens in valves of this type that if the circuit is broken at one of the peaks, there may be sufficient residual magnetism in the core of the coil 170 to permit the valve to hold open. This, however, is avoided by use of the leakage resistor 176 which may have a typical value of something of the order of 30,000 ohms.

Relay contacts 120—120a are arranged in parallel with flame detector relay contacts 130—130a by wire 178 and 180, the former connecting contacts 120a and 130a while the latter connects contacts 120 and 130. One side of this circuit, for instance, that side represented by the contact 120, is connected to the line 152 by a lead 182 while the other side, that is, the wire 178, is connected to the heater coil 184 of a time delay switch 186 and also by a branch 188 to flame detector relay contact 134. The other contact of this last set, that is, the contact 134a, is connected by a wire 190 to the other side of the heater element 184 and also to one side of the bimetal blade 192 of the switch 186. The blade 192 carries one of the contacts of a set 194, the other of which is connected by a lead 196 to one end of relay coil 116, the other end of this coil being connected to a lead 198 extending between relay contacts 122a and 132.

For convenience in discussion, the group of contact blades 72 of the motor speed controller have been indicated by the letters $a$ to $l$, successively, beginning with the shortest blade which is the first to move when the bimetal blade 86 bends upwardly. Of this group, blade $c$ is connected by a wire 200 to the lead 198 previously mentioned. Blade $b$ is connected by a wire 202 to relay contact 122 and also through a high resistance element 204 to contact $a$, this latter contact also being connected by a wire 206 to the side of the circuit indicated by the main line 148. The side of the line 148 is also connected to one end of a bang of resistance elements in series, this group of resistors being indicated generally by the numeral 54 and the individual elements beginning at the lower end, for convenience, being given letters from $m$ to $u$. The common end of resistors $m$ and $n$ is connected by a lead 208 to contact $d$ while similarly the common end of $n$ and $o$ is connected to contact $e$ and so on, the topmost contact $l$ being connected by a wire 210 to the outer end of the resistance bank, that is, the topmost end of resistor $u$. This wire 210 is also connected by a lead 212 to flame detector relay contact 132a and to one end of the motor winding 24a.

The end common to motor windings 24a and 24b is connected by a line 214 to flame detector contact 136a and also to contact 124a of the other relay. Contacts 136 and 124 are connected together by a lead 216 which is connected to one side of the line, that is, the side 152. It will be seen that contact groups 136—136a and 124—124a are in parallel, so that when either set of these contacts is closed, one side of the line will be connected to the common point of the motor windings 24a and 24b. The uncommon end of motor winding 24b is connected to the side of the line 148 through a capacitor 217.

Line 216 which may be considered as an extension of one side of the line 152 is connected by a branch 218 to one end of the control transformer primary 140, the other end being connected directly to the other side of the line 148. The secondary 142 of the control transformer is connected on one side by a lead 220 to one end of the resistance heater 98, the other end of this resistor being connected by a lead 222 to one terminal of the thermostatic impulse sending unit 102, the other contact of this sending unit being connected by a lead 224 to the other side of the transformer primary 142.

The entire heater electric circuit just described is located within the heater case with the exception of the incoming leads 146 and 148, the thermostatic impulse sender 102, and, of course, a portion of the leads extending to this sender. This impulse sender is located within the space to be heated at a point where it will be sensitive to the temperature of the space and operates to maintain this temperature at the desired level.

Operation

The circuit operates in the following manner. Normally, the overheat switch 56 is closed so that as soon as the master switch 150 is closed the lines 148 and 152 will be energized. Under these conditions the control transformer 138 will have its primary energized by way of line 152, branch 218, the transformer primary 140 and thence to the other side of line 148. This energizes the secondary 142 and causes the impulse sender 102 to send on and off impulses of such relative lengths that the average current flowing in the second circuit is a function of the temperature within the space to be heated. If this temperature is high, that is, above the desired level, the off impulses will be long while the on impulses will be short. Therefore, heater 98 does not raise the temperature of the bimetal element 86 sufficiently to close contacts $a$ and $b$. Under these conditions, all of the remaining electric components of the heater remain substantially de-energized.

Some current will flow through the resistor 176 but this is insufficient to actuate the gas valve 170 or the spark transformer primary 162. Also, there is a connection by way of line 182 to line 180, thence through relay contacts 130—130a to line 178 which in turn is connected through resistor 184 and contacts 194 to the relay coil 116 and thence from this coil through relay contacts 132 and 132a to one end of the motor winding 24a, the other end of which is connected to the other motor winding 24b, which in turn is connected to the other side of the line 148 through the capacitor 217. The lead 212 is also connected to the other side of the line 148 through the bank of resistors from $m$ to $u$. The resistance of all these elements in series or series parallel is so high that the current flowing is insufficient to actuate any of these elements and does not constitute appreciable wastage of electric power.

If the temperature within the space to be heated decreases, the average current flow through the heater 98 will increase until bimetal element 86 has moved contact $a$ against contact $b$. This shorts out the resistor 204 across these contact points. This resistor acts merely to prevent sparking at the contacts when the motor circuit is opened. Closing contacts $a$ and $b$, however, does nothing beyond conditioning the circuit for future operation since lead 202 is open circuited at the relay contact 122.

A slight further drop in temperature in the space to be heated brings contact $b$ against contact $c$ so as to energize the relay coil 116 and the heater 186 of the time delay switch 184 in the following manner. Current flows from the line 152 by way of leads 182 and 180 and contacts 130—130a to line 178. From here the current passes through the heating element 186, switch blade 192 and contact 194 to lead 196 which is connected to relay coil 116. From the other side of the relay coil the current passes through leads 198 and 200 to contact $c$ and thence through contacts $b$ and $a$ to lead 206 which is connected with the other side of the line 148. The heater element 186, therefore, begins heating and the rate of heating is so arranged with respect to the characteristics of the bimetal blade 192 that it takes approximately forty-five seconds or so for this switch to open, provided the heating is continuous.

Energization of coil 116 shifts the relay contacts with the following result. The spark transformer 162 is energized by way of contacts 118—118a and normally closed contacts 128—128a. Sparking, therefore, commences at the igniter. Also gas valve 170 is opened since it is energized through contacts 118—118a. Closing of contacts 120—120a has no immediate effect upon the circuit, but conditions it for future operation, these contacts being for the purpose of holding a circuit which otherwise would be subsequently broken. Contacts 122—122a also act to hold a circuit which would otherwise be broken subsequently. Closing of contact 124—124a permits current to flow from one side of the line 152 through contacts 124—124a to lead 214 which is connected to the common point of motor windings 24a and 24b. This energizes the shaded winding 24b by way of capacitor 217 and energizes the principal winding 24a through lead 212, contacts 132—132a and leads 198 and 200 to contact $c$ which, as previously mentioned, is connected through contacts $b$ and $a$ to the other side of the line, 206 to 148.

Therefore, closing of contacts $b$ and $c$ places the ignition system in operation, turns on the fuel gas, and starts the blower motor at full speed. Under these conditions combustion should take place almost instantaneously and approximately twenty seconds later the flame detector switch 154 should close, thereby energizing flame detector relay coil 126. This causes contacts 128—128a, 130—130a and 132—132a to open and contacts 134—134a and 136—136a to close. Opening of contacts 128—128a de-energizes the spark transformer 162, thereby turning off the ignition since it is no longer needed. Opening of contacts 130—130a does not affect the circuit since contacts 120—120a in parallel therewith have been previously closed. Closing of contacts 134—134a shorts out the resistance heater 186 with the result that the time delay switch begins to cool without having opened. Energization of relay coil 116, therefore, takes place directly by way of contacts 134—134a. Closing of contacts 136—136a has no immediate effect since they are in parallel with previously closed contacts 124—124a.

When contacts 132—132a separate, this opens the direct connection between the side of the line 148 and the motor winding 24a and thereby causes winding 24a to be energized by way of branch 212 and resistance elements, u, t, s, r, q, p, o, n and m. The motor, therefore, immediately drops to its lower speed of operation.

The reason for starting the motor and blowers at other than their lowest speed is that the torque necessary to overcome friction and start the blowers is considerably more than is necessary to keep them in operation. Therefore, a lower heat output can be achieved if the heater is started at a rate higher than is used for maintaining operation. Also it is possible to maintain efficient combustion at a lower rate of fuel flow than is satisfactory for starting purposes. For these reasons, it is preferred to start the heater at a high rate of heat output and operate at this rate for approximately twenty seconds before dropping the heat output to a lower level. This momentary high rate of heat output also brings the heater up to operating temperature in less time.

If the temperature within the space to be heated continues to fall, the sending unit 102 will send longer and longer power impulses to the heating element 98 with the result that the bimetal element 86 will deflect farther upwardly, bringing together more and more contacts in the group a, b, c, d and so on. As each successive set of contacts is brought together, one of the resistance elements m, n, o, p and so on will be shorted out beginning with m so that the speed of operation of the blower motor increases progressively with a decrease in temperature within the space to be heated, thereby increasing the rate of heat output until a balance is reached. If this balance is approximately reached, for instance, when f and g contacts are together, then the only motor resistors remaining in the circuit are u, t, s, r, and q. If the temperature gradually rises above this level, contact f will be separated from contact g, thereby adding resistor p to the series connection so as slightly to decrease the speed of the blower motor.

Under normal conditions, the heater may operate continuously for days or even months throughout moderately cold to severe weather completely within the range of the resistance bank 54. Eventually, however, the temperature within the space to be heated will tend to rise even with decreased heat output until contact b is separated from contact c. The separation of these two contacts does not immediately affect the circuit, however, since these two contacts are for the purpose of starting the motor at high speed and have no effect upon the circuit after operation of the two relays. Presently, however, contact a will be separated from contact b, thereby disconnecting lead 202 from the side of line 148. The relay coil 116 is, therefore, de-energized. This turns off the gas valve so as to terminate combustion. The motor, however, continues to operate at its lowest speed, being energized through contacts 136—136a. After the heater has cooled down somewhat, the flame detector switch 154 will open, thereby permitting the contacts of the flame detector relay to shift to their original starting position. The blower motor, therefore, stops a short time after combustion has been terminated and after the blower motor has had an opportunity to sweep out all of the exhaust gases from the combustion chamber and to cool the heater.

If it should happen that the contacts a and b separate, thereby permitting the relay coil 116 to be de-energized, and that substantially immediately thereafter the temperature within the space to be heated should fall sufficiently to cause contacts a and b to reclose, the heater will not immediately restart, starting being postponed until contacts b and c are brought together. The circuit is thus arranged so that the heater will not rapidly cycle off and on in mild weather. It also prevents chattering of the contacts, since even though contacts b and c close only momentarily their subsequent reopening will not de-energize the blower motor.

If at any time the power supply to the heater fails, the gas valve will close and the motor will stop, but the heater will restart promptly as soon as the electrical circuit is reestablished. Overheating of the heater, such as may be caused by some interruption of the flow of ventilating air, will cause the overheat switch 56 to operate, thereby affecting the circuit exactly as though the main power supply had been turned off.

As previously described, if the heater does not start promptly, the time delay lock-open switch 186 will be actuated to interrupt heater operation and to turn off the gas supply until the reason for the malfunctioning has been corrected and the lock-open switch reset. If the heater ignites normally and operates for a time and then combustion ceases for any reason, the flame detector switch 154 will cool until the circuit through the relay coil 126 is opened. This separates contacts 134—134a so as to remove the short around the heater coil 184. In approximately twenty seconds, therefore, the time delay switch 186 operates so as to turn off the system and prevent starting until the time delay switch has been manually reset.

From the above description of a preferred embodiment of our invention it will be seen that a heater of this type fulfills all of the objects set out for it at an earlier portion in this specification and that such a heater is in fact admirably suited for its purpose.

Having described our invention, what we claim as new and desire to secure by Letters Patent of the United States is:

1. In a control system for a heater of the type in which the heat output is determined by the voltage applied to an electric motor, the combination comprising, a plurality of electrical resistors in series with said motor, a gang switch for shorting successive resistors in said series as successive switches in said gang are closed, a bimetal thermotatic element for operating said gang switch, an electric heater for heating said thermostatic element, an electric impulse sending device in circuit with said heating element, said sending device being adapted to supply a greater or lesser average current to said heating element depending upon the ambient temperature at said sending device, said gang switch including a plurality of contact-carrying spring metal blades biased to have their free positions beyond certain desired positions in one direction, stop means to maintain said blades at the certain desired positions against said bias, and said thermostatic means operating to move the first blade in said gang in a direction opposite to said one direction to bring said first blade away from said stop means and into contact with the second blade in said gang, and upon further movement to move said second blade away from said stop means and into contact with said third blade and with still further movement to move successively more remote blades from said first blade away from said stop means and into contact with the next more remote blade.

2. In a control system for a heater of the type in which the heat output is determined by the voltage applied to an electric motor, the combination comprising, a plurality of electrical resistors in series with said motor, a gang switch for shorting successive resistors in said series as successive switches in said gang are closed, a bimetal thermotatic element for operating said gang switch, an electric heater for heating said thermostatic element, an electric impulse sending device in circuit with said heating element, said sending device being adapted to supply a greater or lesser average current to said heating element depending upon the ambient temperature at said sending device, said gang switch including a plurality of contact-carrying spring metal blades biased to have their free positions beyond certain desired positions in one direction, stop means to maintain said blades at the certain desired positions against said bias, said thermostatic means operating to move the first blade in said gang in a direction opposite to said one direction to bring said first blade away from said stop means and into contact with the second blade in said gang, and upon further movement to move said second blade away from said stop means and into contact with said third blade and with still further movement to move successively more remote blades from said first blade away from said stop means and into contact with the next more remote blade, and circuit means including said blades to start said heater when second and third blades in said series are brought into contact as said thermostatic element is moving in a direction to close successive contacts and to stop said heater when said first and second blades are separated when said thermostatic element is moving in a direction to separate said blades.

3. In a control system for a heater of the type in which the heat output is determined by the voltage applied to an electric motor, the combination comprising, a plurality of electrical resistors in series with said motor, a gang switch for shorting successive resistors in said series as successive switches in said gang are closed, a bimetal thermostatic element for operating said gang switch, an electric heater for heating said thermostatic element, an electric impulse sending device in circuit with said heating element, said sending device being adapted to supply a greater or lesser average current to said heating element depending upon the ambient temperature at said sending device, said gang switch including a plurality of contact-carrying spring metal blades biased to have their free positions beyond certain desired positions in one direction, stop means to maintain said blades at the certain desired positions against said bias, said thermostatic means operating to move the first blade in said gang in a direction opposite to said one direction to bring said first blade away from said stop means and into contact with the second blade in said gang, and upon further movement to move said second blade away from said stop means and into contact with said third blade and with still further movement to move successively more remote blades from said first blade waay from said stop means and into contact with the next more remote blade, circuit means including said blades to start said heater when the second and third blades in said series are brought into contact as said thermostatic element is moving in a direction to close successive contacts and to stop said heater when said first and second blades are separated when said thermostatic element is moving in a direction to separate said blades, and said circuit means including means for temporarily shorting at least some of the resistors in said series when said second and third blades are brought into contact and for subsequently removing the last said short.

References Cited in the file of this patent
UNITED STATES PATENTS

| | | |
|---|---|---|
| 1,885,050 | Smulski | Oct. 25, 1932 |
| 2,246,301 | Hanna | June 17, 1941 |
| 2,372,307 | Alexander | Mar. 27, 1945 |
| 2,425,998 | Crise | Aug. 19, 1945 |
| 2,427,674 | Holthouse | Sept. 23, 1947 |
| 2,483,747 | Williams | Oct. 4, 1949 |
| 2,502,345 | Ryder | Mar. 28, 1950 |
| 2,507,119 | Randall et al. | May 9, 1950 |